US011346544B2

(12) United States Patent
Moller et al.

(10) Patent No.: US 11,346,544 B2
(45) Date of Patent: May 31, 2022

(54) SYSTEM AND METHOD FOR TOP PLATFORM ASSEMBLY OF HEAT RECOVERY STEAM GENERATOR (HRSG)

(71) Applicant: General Electric Company, Schenectady, NY (US)

(72) Inventors: Phillip Geoffrey Moller, Untersiggenthal (CH); Janmejaya Tripathy, Baden (CH)

(73) Assignee: General Electric Company, Schenectady, NY (US)

( * ) Notice: Subject to any disclaimer, the term of this patent is extended or adjusted under 35 U.S.C. 154(b) by 105 days.

(21) Appl. No.: 16/571,038

(22) Filed: Sep. 13, 2019

(65) Prior Publication Data

US 2021/0063012 A1 Mar. 4, 2021

Related U.S. Application Data

(60) Provisional application No. 62/895,925, filed on Sep. 4, 2019.

(51) Int. Cl.
*F22B 1/18* (2006.01)
*F22B 33/14* (2006.01)
(Continued)

(52) U.S. Cl.
CPC ............ *F22B 1/1815* (2013.01); *F22B 33/14* (2013.01); *F22B 37/001* (2013.01); *E04B 1/348* (2013.01); *E04H 1/005* (2013.01); *F22B 37/225* (2013.01)

(58) Field of Classification Search
CPC ...... F22B 1/1815; F22B 33/14; F22B 37/001; F22B 7/16; F22B 9/18; F22B 37/006;
(Continued)

(56) References Cited

U.S. PATENT DOCUMENTS

| | | | | |
|---|---|---|---|---|
| 4,685,426 A | * | 8/1987 | Kidaloski | ............... F22B 37/36 122/214 |
| 5,339,891 A | * | 8/1994 | Kidaloski | ............. F22B 37/001 122/494 |

(Continued)

FOREIGN PATENT DOCUMENTS

| | | |
|---|---|---|
| EP | 2933555 A1 | 10/2015 |
| GB | 1156944 A | 7/1969 |

(Continued)

OTHER PUBLICATIONS

PCT International Search Report and Written Opinion; Application No. PCT/US2020/049090; dated Jan. 14, 2021; 13 pages.

*Primary Examiner* — Michael G Hoang
*Assistant Examiner* — Andrew W Cheung
(74) *Attorney, Agent, or Firm* — Fletcher Yoder, P.C.

(57) ABSTRACT

A heat recovery steam generator (HRSG) includes a base and a top platform assembly disposed on the base. The top platform assembly includes a first top platform auxiliary module having a first rectangular frame in which a steam manifold is disposed, a second top platform auxiliary module having a second rectangular frame in which a high pressure (HP) drum is disposed, and a third top platform auxiliary module having a third rectangular frame in which a low pressure (LP) drum and an intermediate pressure (IP) drum are disposed. Each top platform auxiliary module may be pre-assembled on the ground prior to be raised to elevation for installed on the base.

5 Claims, 14 Drawing Sheets

(51) Int. Cl.
*F22B 37/00* (2006.01)
*F22B 37/22* (2006.01)
*E04H 1/00* (2006.01)
*E04B 1/348* (2006.01)

(58) Field of Classification Search
CPC ...... F22B 37/225; F22B 37/645; F22B 37/64; F22B 37/66; F22B 37/005; F01K 13/00; E04B 1/3483; E04B 1/348; E04B 2001/34892; E04B 7/026; E04H 5/02; E04H 1/005; E04H 5/12; Y10S 52/00; F28F 9/007; F28F 9/0075; F28F 9/013
USPC ........................................................ 122/7 R
See application file for complete search history.

(56) References Cited

U.S. PATENT DOCUMENTS

| | | | | |
|---|---|---|---|---|
| 5,370,239 | A * | 12/1994 | Kidaloski | F22B 37/001 211/189 |
| 5,386,676 | A * | 2/1995 | Kidaloski | F16L 59/02 403/28 |
| 6,019,070 | A * | 2/2000 | Duffy | F22B 37/50 122/209.1 |
| 6,092,591 | A * | 7/2000 | McDonald | F22B 1/1815 165/145 |
| 6,588,104 | B2 * | 7/2003 | Heidrich | F22B 37/244 29/890.051 |
| 10,060,142 | B2 * | 8/2018 | Haessler | B66F 11/04 |
| 2006/0144348 | A1 | 7/2006 | Viskup | |
| 2007/0221144 | A1 * | 9/2007 | Becker | F22B 37/104 122/511 |
| 2008/0134589 | A1 * | 6/2008 | Abrams | E04B 1/34384 52/79.1 |
| 2009/0265935 | A1 * | 10/2009 | Reiner | F22B 37/244 29/890.051 |
| 2012/0279141 | A1 * | 11/2012 | Wiederick | E04B 1/3483 52/79.5 |
| 2013/0305629 | A1 * | 11/2013 | Stephenson | E04B 1/3483 52/79.9 |
| 2015/0000249 | A1 * | 1/2015 | Carroni | B01D 53/62 60/39.182 |
| 2017/0175998 | A1 * | 6/2017 | Torkildson | F22B 37/001 |
| 2017/0350150 | A1 * | 12/2017 | Rudlinger | E04H 5/02 |

FOREIGN PATENT DOCUMENTS

KR  20150064839 A  6/2015
WO  2015191266 A1  12/2015

* cited by examiner

SYSTEM AND METHOD FOR TOP PLATFORM ASSEMBLY OF HEAT RECOVERY STEAM GENERATOR (HRSG)

CROSS-REFERENCE TO RELATED APPLICATION

This application claims benefit of U.S. Provisional Patent Application No. 62/895,925, entitled "SYSTEM AND METHOD FOR TOP PLATFORM ASSEMBLY OF HEAT RECOVERY STEAM GENERATOR (HRSG)", filed Sep. 4, 2019, which is herein incorporated by reference in its entirety.

BACKGROUND

The subject matter disclosed herein relates to a system and method for assembly of a heat recovery steam generator (HRSG), including a top platform assembly of the HRSG.

A HRSG is a heat exchanger generally utilized to recover heat from an exhaust gas. For example, the HRSG may be a part of a combined cycle power plant (CCPP) having one or more gas turbine engines configured to combust an air-fuel mixture to generate combustion gases. The combustion gases may drive rotation of a turbine of the gas turbine engine, which may be coupled to a load (e.g., electrical generator) that uses the rotational energy to generate electricity for a power grid. The combustion gases may exit the turbine as exhaust gas, which retains heat after passing through the turbine. The exhaust gas may ultimately be passed to the HRSG. The HRSG may include one or more stages (e.g., pressure stages), each of which including an evaporator (e.g., water coils) over which the exhaust gas is directed. The exhaust gas may heat the water in the evaporator, thereby generating steam collected and/or separated from the water in a drum connected to a top of the evaporator (e.g., directly or indirectly). The steam may be utilized to drive one or more steam turbines of the CCPP. In this way, the HRSG operates as a thermodynamic link between the gas turbine(s) and the steam turbine(s) of the CCPP.

In traditional embodiments, drums of the traditional HRSG and/or other equipment generally disposed at a top of the traditional HRSG may be heavy and difficult to interface with other portions of the traditional HRSG, leading to construction complexities that can be tedious and take a considerable amount of time. It is now recognized that improved HRSG componentry and construction techniques are desired.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a heat recovery steam generator (HRSG) includes a base and a top platform assembly disposed on the base. The top platform assembly includes a first top platform auxiliary module having a first rectangular frame in which a steam manifold is disposed, a second top platform auxiliary module having a second rectangular frame in which a high pressure (HP) drum is disposed, and a third top platform auxiliary module having a third rectangular frame in which a low pressure (LP) drum and an intermediate pressure (IP) drum are disposed.

In a second embodiment, a top platform auxiliary module of a heat recovery steam generator (HRSG) includes a frame. The top platform auxiliary module also includes a terminal connection disposed within the frame and configured to couple to a corresponding terminal connection disposed within a base of the HRSG. The top platform auxiliary module also includes a mounting assembly extending outwardly from the frame and configured to receive a mounting feature of the base of the HRSG, the mounting assembly being spaced from the terminal connection a distance such that, when the mounting assembly interfaces with the mounting feature, the terminal connection of the top platform auxiliary module is aligned for coupling with the corresponding terminal connection.

In a third embodiment, a method of constructing a heat recovery steam generator (HRSG) includes forming a first top platform auxiliary module having a first frame with a first generally flat bottom surface, and having a steam manifold disposed in the first frame. The method also includes forming a second top platform auxiliary module having a second frame with a second generally flat bottom surface, and having a high pressure (HP) drum disposed in the second frame. The method also includes forming a third top platform auxiliary module having a third frame with a third generally flat bottom surface, and having a low pressure (LP) drum and intermediate pressure (IP) drum disposed in the third frame. The method also includes lifting the first top platform auxiliary module to elevation, and disposing the first top platform auxiliary module on a base of the HRSG such that the first generally flat bottom surface of the first top platform auxiliary module is disposed in a plane formed by the base. The method also includes lifting the second top platform auxiliary module to elevation, and disposing the second top platform auxiliary module on the base of the HRSG such that the second generally flat bottom surface of the second top platform auxiliary module is disposed in the plane formed by the base. The method also includes lifting the third top platform auxiliary module to elevation, and disposing the third top platform auxiliary module on the base of the HRSG such that the third generally flat bottom surface of the third top platform auxiliary module is disposed in the plane formed by the base.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
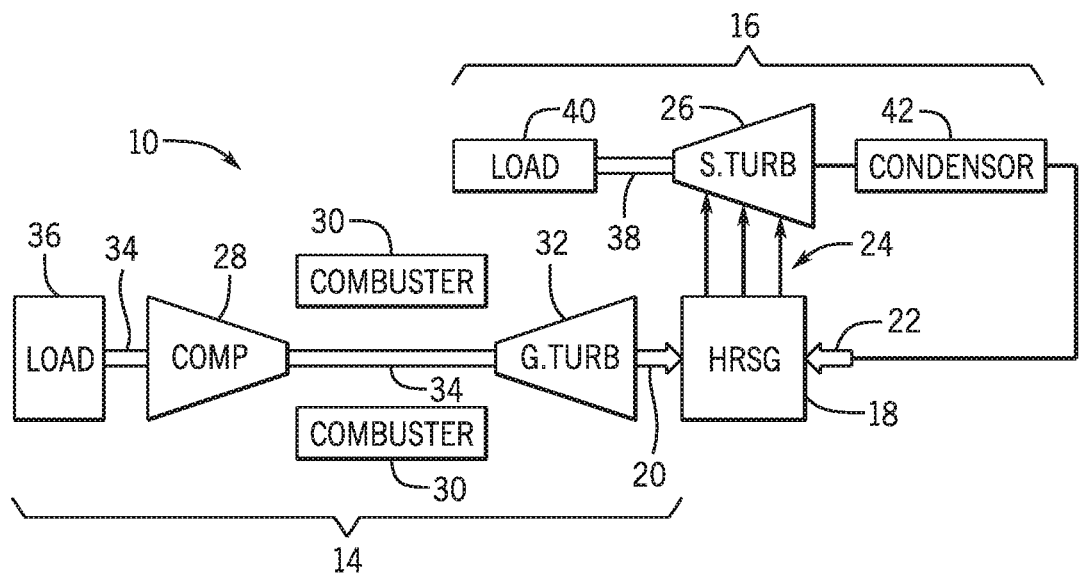
FIG. 1 is a block diagram of an embodiment of a combined cycle power plant (CCPP)

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

A heat recovery steam generator (HRSG) is a heat exchanger generally utilized in a combined cycle power plant (CCPP). The HRSG may flow a hot gas stream (e.g., exhaust gas) from one or more gas turbines of the CCPP across an evaporator (e.g., water coils) in order to generate steam utilized for powering one or more steam turbines of the CCPP. In this way, the HRSG operates as a thermodynamic link between the gas turbine(s) and the steam turbine(s) of the CCPP.

In traditional embodiments, a base of the HRSG (e.g., having an exhaust gas flow path, one or more evaporators, and associated equipment) is designed and constructed, and other components, such as drums and piping (e.g., a steam manifold) of the HRSG, are lifted individually to a top of the base and adapted to connect to the base and corresponding components. For example, the base in traditional embodiments may be modularized and/or standardized, and the drums and manifolds/piping that are disposed on the top of the base are lifted to elevation and connected to the modularized components of the base. The components lifted to the top of the base may be heavy and cumbersome, and it may be necessary to alter the connection techniques on a case-by-case basis (e.g., customized for a particular site or project). These connection techniques executed at elevation may be tedious and complicated, at least because the components disposed on top of the base are heavy and difficult to maneuver. Thus, in traditional embodiments, significant construction/assembly time is spent on interfacing the components disposed on the top of the base with the components residing within the base.

It is presently recognized that construction time of the HRSG can be improved by first modularizing and standardizing the features disposed on the top of the base of the HRSG, and then designing the base, if needed, to accommodate the modules. For example, several "top platform auxiliary modules" may be constructed on the ground, and may have standard sizes, shapes, and terminal connections that can be used for various HRSG embodiments. The top platform auxiliary modules may include, for example, a first top platform auxiliary module in which piping or a manifold (e.g., steam manifold) and corresponding equipment (e.g., silencers, cable trays) are disposed, a second top platform auxiliary module in which a high pressure (HP) drum and corresponding equipment (e.g., silencers, cable trays) are disposed, and a third top platform auxiliary module in which an intermediate pressure (IP) drum, a low pressure (LP) drum, and corresponding equipment (e.g., silencers, cable trays) are disposed. Each top platform auxiliary module may include a generally rectangular frame in which the above-described components are installed, where the generally rectangular frame includes a generally planar bottom side easily received by the base of the HRSG. For example, the base of the HRSG may include a generally planar surface formed by upper ends of one or more columns of the base. Further, each top platform auxiliary module may be constructed on the ground and then elevated (e.g., by cranes) to be disposed on the top of the base of the HRSG. That is, the drums, silencers, cable trays, piping, manifolds, and/or terminal connections associated with the top platform auxiliary modules may be installed in the top platform auxiliary modules prior to lifting the top platform auxiliary modules to the top of the base of the HRSG, such that all of the components corresponding to each module may be lifted at once with the corresponding module. In other embodiments (not shown), the modules may include components different from those described above, but the modules may be similarly constructed on the ground prior to being raised to elevation to form the top platform assembly.

As suggested above, columns of the base, and the connections of the base (e.g., heat exchanger connections, such as superheater, economizer, or evaporator connections), may be designed to fit and/or receive the top platform auxiliary modules, including the modularized/standardized terminal connections of the top platform auxiliary modules. Alterations to accommodate interfacing the top platform auxiliary modules with the base may reside in the base, which may be easier to alter because the equipment is closer to the ground. For example, the columns of the base (and corresponding heat exchange equipment in the columns, such as superheaters, evaporators, and/or economizers) may be spaced a particular distance such that the connections of the base (e.g., heat exchanger connections, such as evaporator connections, superheater connections, or economizer connections) corresponding to each column are appropriately spaced for connecting to the features (e.g., terminal connections, such as terminal fluid connections) residing in the top platform auxiliary modules. Thus, when each top platform auxiliary module is lifted (e.g., via a two-crane technique) to the top of the base of the HRSG, assembly of the top platform auxiliary modules atop the base of the HRSG is simplified relative to traditional embodiments. Indeed, the base may include a planar surface, or several surfaces forming a plane, on which the top platform auxiliary modules are disposed. Further, the top platform auxiliary modules may include a mounting assembly (e.g., a pair of extensions, hooks, arms, or claws) that interface with, or receive, a mounting feature (e.g., a slide-in plate) extending along the top of the base, which positions each top platform auxiliary module with respect to the base and corresponding equipment, and mounts each top platform auxiliary module to the base. After the top platform auxiliary modules are disposed atop the base of the HRSG, the top platform auxiliary modules, and other features built after disposal of the top platform auxiliary modules atop the base, may form a "top platform assembly." These features are described in detail below with respect to the drawings.

By way of introduction, FIG. 1 is a schematic diagram of an embodiment of a combined cycled power plant (CCPP) 10. In the illustrated embodiment, the CCPP 10 includes a gas turbine system 14, a steam turbine system 16, and a heat recovery steam generator (HRSG) 18 disposed between the gas turbine system 14 and the steam turbine system 16. The HRSG 18 is generally configured to enable heat transfer from an exhaust gas 20 of the gas turbine system 14 to a fluid (e.g., water 22) of the steam turbine system 16, thereby generating steam 24 for use in the steam turbine system 16. As shown, separate streams of steam 24 may be generated, such as a high pressure (HP) steam, an intermediate pressure (IP) steam, and a low pressure (LP) steam, each of which being received by a different area or section of a steam turbine 26 of the steam turbine system 16.

The gas turbine system 14 may include a compressor 28, one or more combustors 30, and a turbine 32. In operation, an oxidant (e.g., air, oxygen, oxygen enriched air, or oxygen reduced air) is received by the compressor 28. The compressor 28 pressurizes the air in a series of compressor stages (e.g., rotor disks) with compressor blades. As the compressed air exits the compressor 28, the air enters the combustor 30 and mixes with a fuel. The air-fuel mixture may be ignited in the combustor 30, which then directs the combustion products through one or more turbine stages of the turbine 32. As the combustion products pass through the turbine 32, the combustion products contact turbine blades attached to turbine rotor disks (e.g., one of the turbine stages, each having turbine blades disposed circumferentially about the axis). As the combustion products travel through the turbine 32, the combustion products may force turbine blades to rotate the rotor disks. The rotation of the rotor disks induces rotation of at least one shaft 34 and rotation of the rotor disks in the compressor 28 (e.g., which may be rotatably coupled with the one of the shafts 34). A load 36 (e.g., electrical generator) of the gas turbine system 14 connects to the one of the shafts 34 and uses the rotational energy of the shaft 34 to generate electricity for use by a power grid. The combustion products then exit the gas turbine 32 as the exhaust gas 20.

As previously described, the exhaust gas 20 may then be routed to the HRSG 18, along with the water 22, whereby the HRSG 18 utilizes the exhaust gas 20 to heat the water 22 and generate pressurized steam. The steam turbine system 16 includes the steam turbine 26, a shaft 38, and a load 40 (e.g., electrical generator). As the hot pressurized steam 24 enters the steam turbine 26, the steam 24 contacts turbine blades attached to turbine rotor disks (e.g., turbine stages). As the steam 24 passes through the turbine stages in the steam turbine 26, the steam 24 induces the turbine blades to rotate the rotor disks. The rotation of the rotor disks induces rotation of the shaft 38. As illustrated, the load 40 (e.g., electrical generator) connects to the shaft 38. Accordingly, as the shaft 38 rotates, the load 40 (e.g., electrical generator) uses the rotational energy to generate electricity for the power grid. As the pressurized steam 24 passes through the steam turbine 26, the steam 24 loses energy (i.e., expands and cools). After exiting the steam turbine 26, the steam exhaust may enter a condenser 42, which converts the steam exhaust to the water 22 routed back to the HRSG 18.

Figure 2:
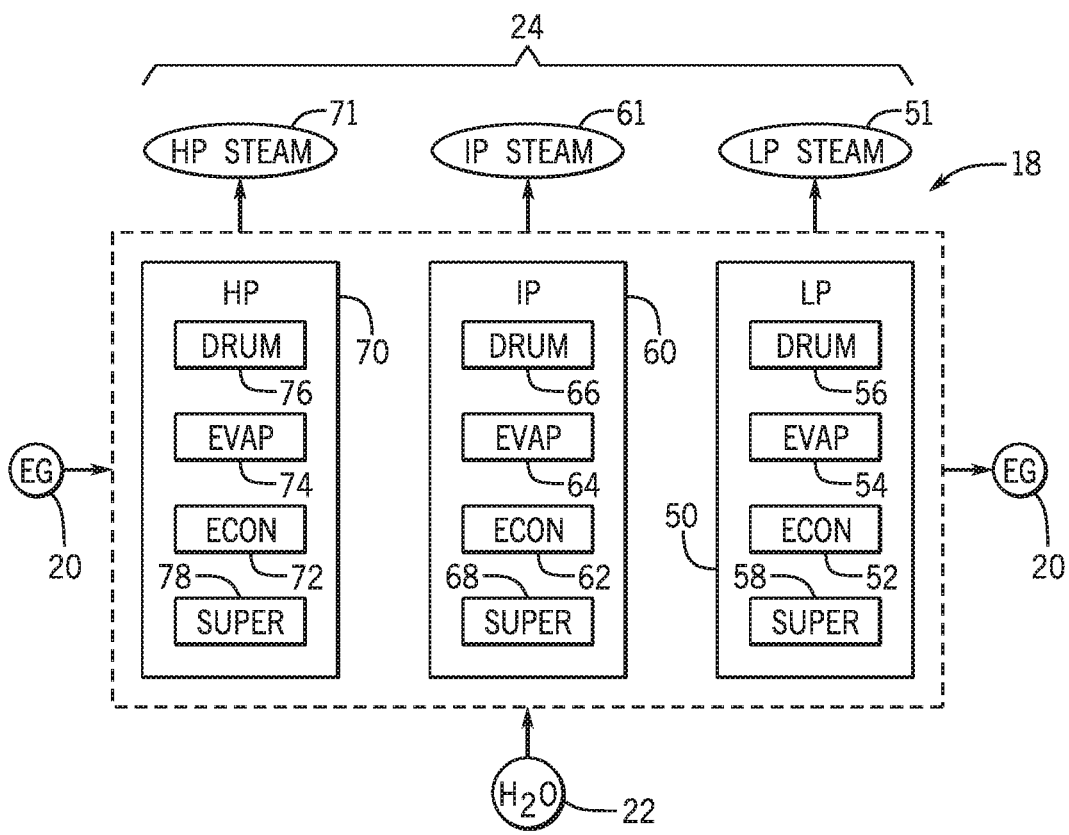
FIG. 2 is a block diagram of an embodiment of a heat recovery steam generator (HRSG) of the CCPP of FIG. 1.

FIG. 2 is a schematic diagram illustrating the HRSG 18 containing a low pressure (LP) section 50, an intermediate pressure (IP) section 60, and a high pressure (HP) section 70. Each section 50, 60, 70 may be configured to generate the steam 24 at various pressures. For example, the LP section 50 may generate LP steam 51, the IP section 60 may generate IP steam 61, and the HP section 70 may generate HP steam 71.

The components of the HRSG 18 in the illustrated embodiment are simplified and are not intended to be limiting. That is, FIG. 2 should not be read as denoting a relative ordering or positioning of the LP section 50, the IP section 60, the HP section 70, or any of the individual components in each of these sections 50, 60, 70. Rather, the illustrated HRSG 18 is shown to convey the general operation of certain HRSG systems. As discussed above, the exhaust gas 20 may be routed to and through the HRSG 18 via a first flow path and used to heat the water 22 routed to the HRSG 18 via one or more second flow paths. The exhaust gas 20 may heat the water 22 in each section 50, 60, 70 of the HRSG 18.

As illustrated in no particular order, the LP section 50 includes an LP economizer 52, an LP evaporator 54, an LP drum 56, and an LP superheater 58. The LP economizer 52 may be a device configured to pre-heat the water 22 to prepare the water 22 for receiving heat from the exhaust gas 20. For example, the LP economizer 52 may generally pre-heat the water 22 to an ideal temperature for controlling an amount of heat required to generate the steam 24. The LP economizer 52 may then direct the pre-heated water 22 to other components of the HRSG 18, for example, the LP drum 56. The LP drum 56 may be a storage container that feeds the water 22 to the LP evaporator 54. The LP evaporator 54 may receive the pre-heated water 22 to further heat the water 22 to generate the steam 24. In some embodiments, the water 22 may be in a vapor form before, during, or after being heated by the exhaust gas 20 in the LP evaporator 54. The steam 24 may then be received by the LP superheater 58, which may convert saturated steam produced by the LP evaporator 54 into superheated or dry steam (e.g., the steam 24).

As illustrated, the IP section 60 may include an IP economizer 62, an IP evaporator 64, an IP drum 66, and an IP superheater 68. The IP economizer 62, the IP evaporator 64, the IP drum 66, and the IP superheater 68 may have similar functionality as the LP economizer 52, the LP evaporator 54, the LP drum 56, and the LP superheater 58, respectively. Further, as illustrated, the HP section 70 includes an economizer 72, an evaporator 74, a drum 76, and a superheater 78. The HP economizer 72, the HP evaporator 74, the HP drum 76, and the HP superheater 78 may have similar functionality as the LP economizer 52, the LP evaporator 54, the LP drum 56, and the LP superheater 58, respectively. Of course, as previously described, HRSGs 18 in accordance with the present disclosure may include fewer components or other components than those described above. In particular, the HRSG 18 may additionally include one or more steam manifolds configured to receive the steam 24 and direct the steam 24 toward the steam turbine system 16 illustrated in FIG. 1.

As suggested in the description above, the HRSG 18 of FIG. 2 (and CCPP of FIG. 1) can be large and require complicated construction methods. In industrial scale embodiments, for example, a top of the HRSG 18 may be elevated 30 meters (approximately 98 feet) or more above the ground. Further, certain heavy and/or cumbersome components of the HRSG 18 may be disposed at the top of the HRSG 18. For example, the LP drum 56, IP drum 66, and HP drum 76 illustrated in the schematic diagram of FIG. 2 may be disposed at or adjacent to the top of the HRSG 18. Associated piping connecting the drums 56, 66, 76 to the various other components of the HRSG 18 may also be disposed at or adjacent to the top of the HRSG 18.

In traditional embodiments, a base of the HRSG 18 may be designed and constructed first, and the components disposed at the top of the HRSG 18 may be raised individually, for example, by one or more cranes, and then adapted at elevation to fit on, or couple to, the base of the HRSG 18. That is, in traditional embodiments, the base of the HRSG 18 may be constructed in standard modules having certain of the components disposed below the top of the HRSG 18, such as the evaporators, economizers, and/or superheaters. In these traditional embodiments, the components disposed at the top of the HRSG 18 are not modularized, and are instead adapted, modified, devised, or otherwise improvised to fit the modules forming the base of the HRSG 18. This traditional construction technique may include procedures at elevation that are not efficient, which can substantially increase construction time.

It is presently contemplated that, in accordance with this disclosure, the components disposed at or adjacent to the top of the HRSG 18 may be modularized with standard features (referred to herein as "top platform auxiliary modules"), and the base of the HRSG 18 may be designed around the features of the top platform auxiliary modules.

Figure 3:
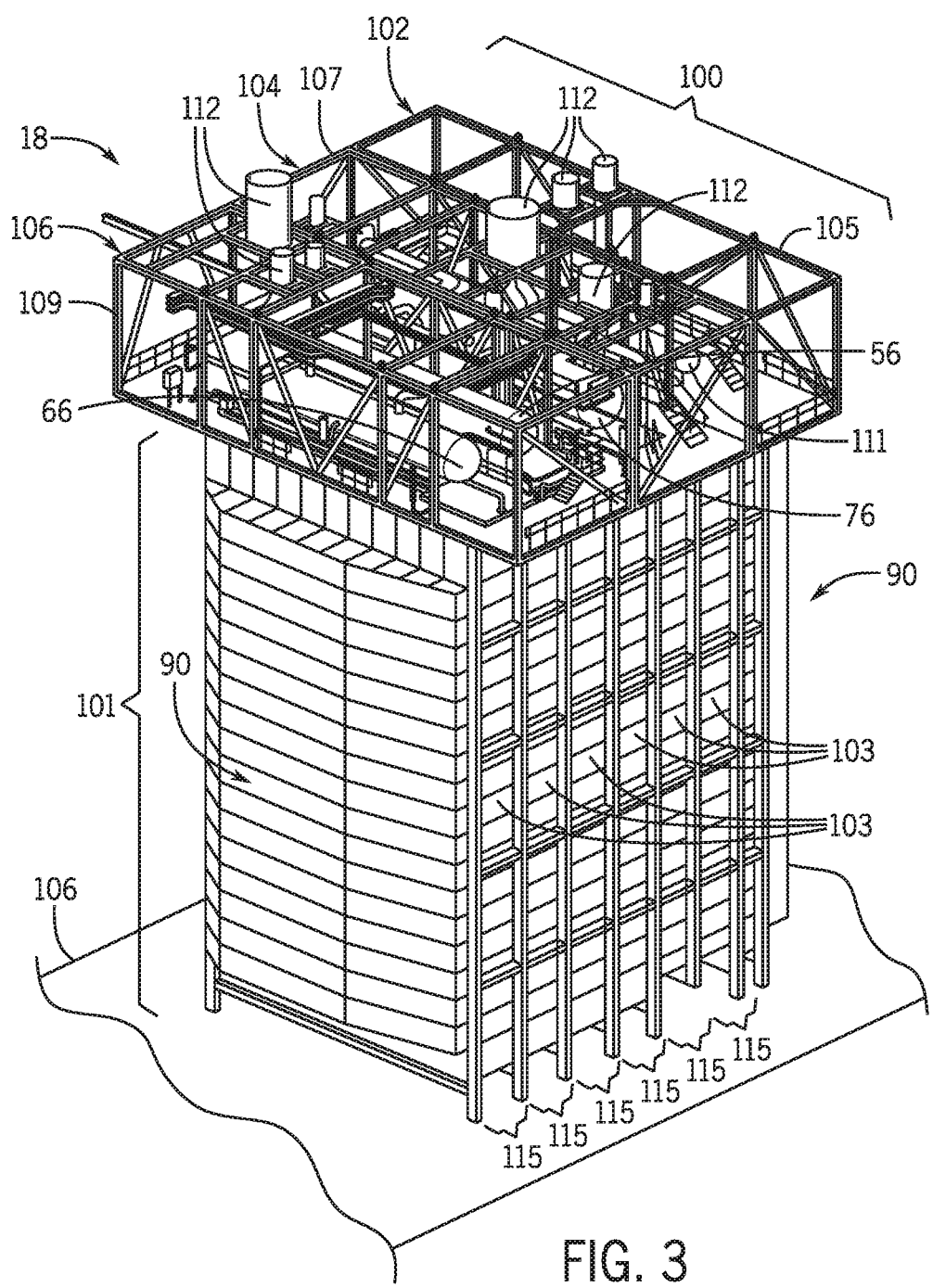
FIG. 3 is a perspective view of an embodiment of the HRSG of FIG. 2, having a top platform assembly disposed on a base.

For example, FIG. 3 illustrates an embodiment of a portion of the HRSG 18 having a top platform assembly 100 and a base 101. The illustrated embodiment does not include a smoke stack or an exhaust gas duct, although it should be appreciated that these components would normally be included on ends 90 of the HRSG 18. As shown, three top platform auxiliary modules 102, 104, 106 form the top platform assembly 100 and are disposed on top of the base 101. Of course, each of the top platform auxiliary modules 102, 104, 106 is assembled individually (e.g., on the ground 106), and each top platform auxiliary module 102, 104, 106 is individually lifted from the ground 106 to a top of the base 101 and disposed on the top of the base 101. The components residing within each top platform auxiliary module 102, 104, 106 are, as previously described, pre-arranged and standardized. That is, terminal connections of the top platform auxiliary modules 102, 104, 106 are arranged first, prior to elevating the top platform auxiliary modules 102, 104, 106 to elevation, and the connection portions (e.g., evaporator connections, superheater connections, or economizer connections) from the base 101 are constructed to be coupled to the terminal connections of the top platform auxiliary modules 102, 104, 106 (for example, via intermediary pipe segments). That is, as shown, the base 101 may include columns 103 disposed in a row, where the columns 103 are spaced at particular distances 115 to ensure that the components within the columns 103, and connection features of the components disposed within the columns 103, are appropriately spaced for receiving and connecting the top platform auxiliary modules 102, 104, 106 after they are lifted to the top of the base 101. In the illustrated embodiment, the columns 103 may be spaced distances 115 of, for example, between 2.0 meters (6.6 feet) and 5.0 meters (16.4 feet), 2.5 meters (8.2 feet) and 4.5 meters (14.8 feet), 3.0 meters (9.8 feet) and 4.0 meters (13.1 feet), or 3.25 meters (10.7 feet) and 3.75 meters (12.3 feet).

Further, the standardized terminal connections of the top platform auxiliary modules 102, 104, 106 may be designed to accommodate reception of a range of pressure parts disposed in the base 101. That is, the top platform auxiliary modules 102, 104, 106 may be designed to accommodate columns 103 spaced any distance 115 within one of the above-described ranges. Thus, the top platform auxiliary modules 102, 104, 106, despite being standardized, are versatile for interfacing with various size bases 101, depending on output needs of the HRSG 18.

Figure 4:
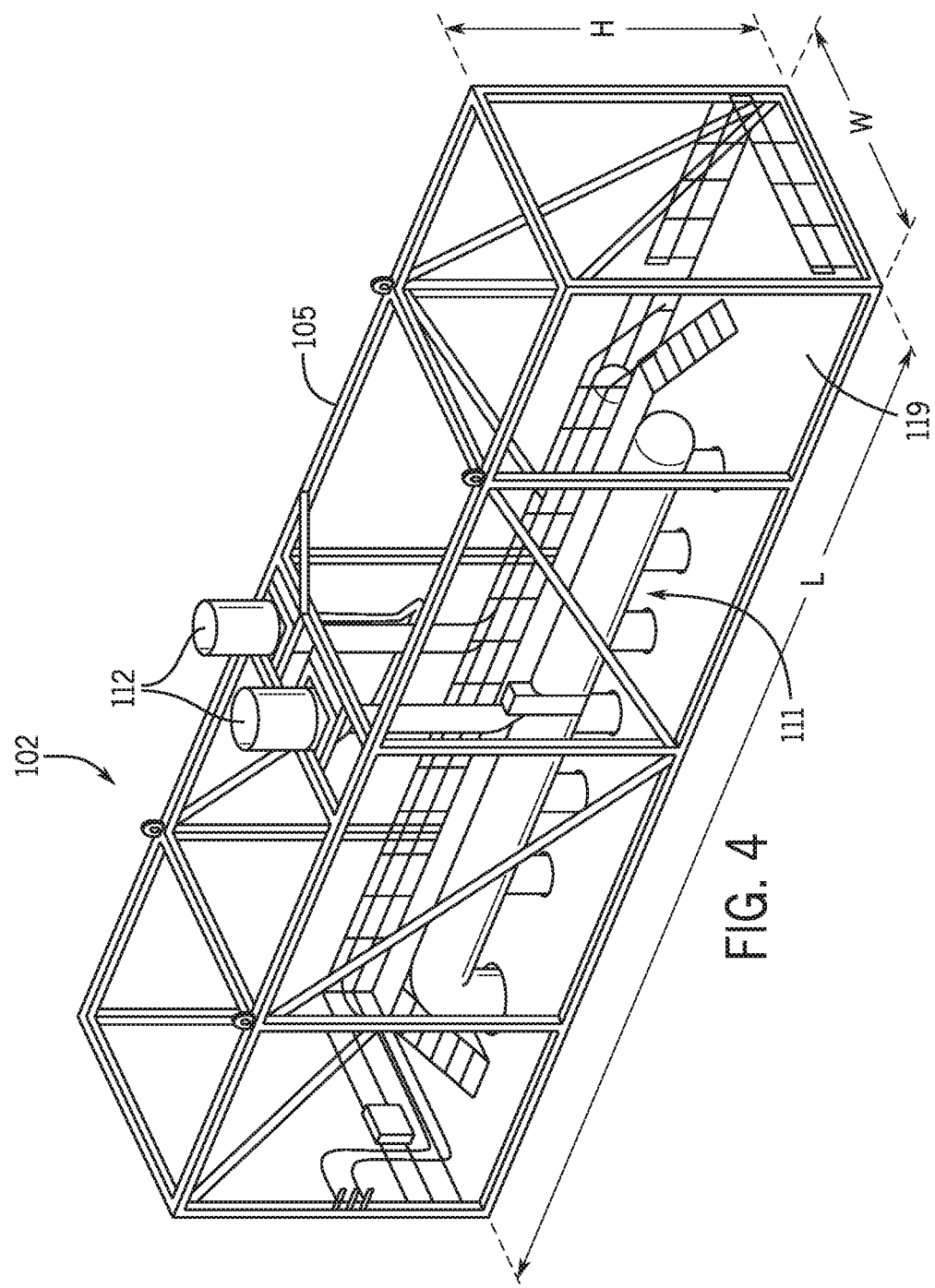
FIG. 4 is a perspective view of an embodiment of a top platform auxiliary module for the top platform assembly of the HRSG of FIG. 3, where the top platform auxiliary module includes a steam manifold.

In the illustrated embodiment, and as shown in FIG. 4, the first top platform auxiliary module 102 includes piping (or a steam manifold 111), cable trays, and silencers 112, which are disposed at least partially in, and/or integrated with, a frame 105 of the first top platform auxiliary module 102. The frame 105 of the first top platform auxiliary module 102 includes an approximate length×width×height of 25.6 meters×6.6 meters×7.4 meters (84 feet×22 feet×24 feet), with an approximate weight of 130 tons. The first top platform auxiliary module 102 does not include the LP drum 56, the IP drum 66, or the HP drum 76. The second top platform auxiliary module 104 (shown in FIG. 5) includes the HP drum 76, cable trays, and silencers 112, which are disposed at least partially in, and/or integrated with, a frame 107 of the second top platform auxiliary module 104. The frame 107 of the second top platform auxiliary module 104 includes an approximate length×width×height of 25.6 meters×8.5 meters×7.4 meters (84 feet×28 feet×24 feet), with an approximate weight of 350 tons. The second top platform auxiliary module 104 does not include the LP drum 56, the IP drum 66, or the steam manifold 111. The third top platform auxiliary module 106 (shown in FIG. 6) includes the IP drum 66, the LP drum 56, cable trays, and silencers 112, which are disposed at least partially in, and/or integrated with, a frame 109 of the third top platform auxiliary module 106. The frame 109 of the third top platform auxiliary module 106 includes an approximate length× width×height of 25.6 meters×8.5 meters×7.4 meters (84 feet×28 feet×24 feet), with an approximate weight of 222 tons. The third top platform auxiliary module 106 does not include the steam manifold 111 or the HP drum 76.

As shown in FIG. 3 and described above, the frames 105, 107, 109 of the top platform auxiliary modules 102, 104, 106 may each include the same length and height. In the illustrated embodiment, the frame 105 of the first top platform auxiliary module 102 includes a different width than the frame 107 of the second top platform auxiliary module 104 and the frame 109 of the third top platform auxiliary module 106. It should be noted that, in accordance with the present disclosure, each dimension of the frames 105, 107, 109 of each top platform auxiliary module 102, 104, 106 may be varied by as much as +/−10%. For example, the sizing of the frame 105 of the first top platform auxiliary module 102 may be within the following ranges: (23 meters-28.2 meters [75.5 feet to 92.5 feet])×(5.9 meters-7.3 meters [19.4 feet to 24 feet])×(6.7 meters to 8.1 meters [22 feet to 26.6 feet]). Further, the sizing of the frame 107 of the second top platform auxiliary module 104 may be within the following ranges: (23 meters-28.2 meters [75.5 feet to 92.5 feet])×(7.7 meters-9.4 meters [25.3 feet to 30.8 feet])×(6.7 meters-8.1 meters [22 feet to 26.6 feet]). Further still, the sizing of the frame 109 of the third top platform auxiliary module 106 may be within the following ranges: (23 meters-28.2 meters [75.5 feet to 92.5 feet])×(7.7 meters-9.4 meters [25.3 feet to 30.8 feet])×(6.7 meters-8.1 meters [22 feet to 26.6 feet]). It should also be noted that the above-described ranges are not limited by the ratio included in the more precise examples above. In other words, the frame 109 of the third top platform auxiliary module 106 could include the following sizing, which is within the above described ranges: 23 meters×9.4 meters×7.0 meters (75.5 feet×30.8 feet×23 feet). However, in general, the frames 105, 107, 109 of the top platform auxiliary modules 102, 104, 106 may each include the same length and height, whereas the frame 105 of the first top platform auxiliary module 102 may include a different width than the frames 107, 109 of the second top platform auxiliary module 104 and the third top platform auxiliary module 106, respectively.

Further, for each top platform auxiliary module 102, 104, 106, the width and height may be a function (e.g., ratio) of the length. For example, the first top platform auxiliary module 102 may include a length of L, a width of 0.26 L, and a height of 0.29 L. The second top platform auxiliary module 104 may include a length of L, a width of 0.33 L, and a height of 0.29 L. The third top platform auxiliary module 104 may include a length of L, a width of 0.33 L, and a height of 0.29 L. However, the above-described ratios may differ slightly, depending on the embodiment. For example, the first top platform auxiliary module 102 may include a length of L, a width of 0.21-0.31 L, and a height of 0.24-0.35 L. The second top platform auxiliary module 104 may include a length of L, a width of 0.27 L-0.41 L, and a height of 0.24 L-0.35 L. The third top platform auxiliary module 106 may include a length of L, a width of 0.27 L-0.41 L, and a height of 0.24 L-0.35 L.

It should also be noted that, in certain circumstances, shipping constraints may require that the top platform auxiliary modules 102, 104, 106 include smaller heights than those described above. For example, in certain circumstances in which shipping constraints are present, each of the top platform auxiliary modules 102, 104, 106 may be split into two portions along the height dimension, each portion having half the height disclosed in the above examples. That is, the footprints (i.e., length×width) may remain the same, but the module may be halved along the height dimension. In such embodiments, the split portions of each top platform auxiliary module 102, 104, 106 may be connected on the ground prior to being lifted to elevation. In other embodiments, each of the six portions may be lifted to elevation individually.

As shown in FIG. 3, the top platform auxiliary modules 102, 104, 106 disposed on the top of the base 101, and forming the top platform assembly 100, may hang over a perimeter of the base 101. Because the top platform auxiliary modules 102, 104, 106 are assembled/constructed on the ground, including the generally rectangular frames thereof, components that would otherwise hang over beyond the perimeter of the base 101 and require cumbersome assembly techniques with respect to the base 101 are instead easily disposed on the base 101 while contained within the sturdy, rigid modules 102, 104, 106.

Figure 5:
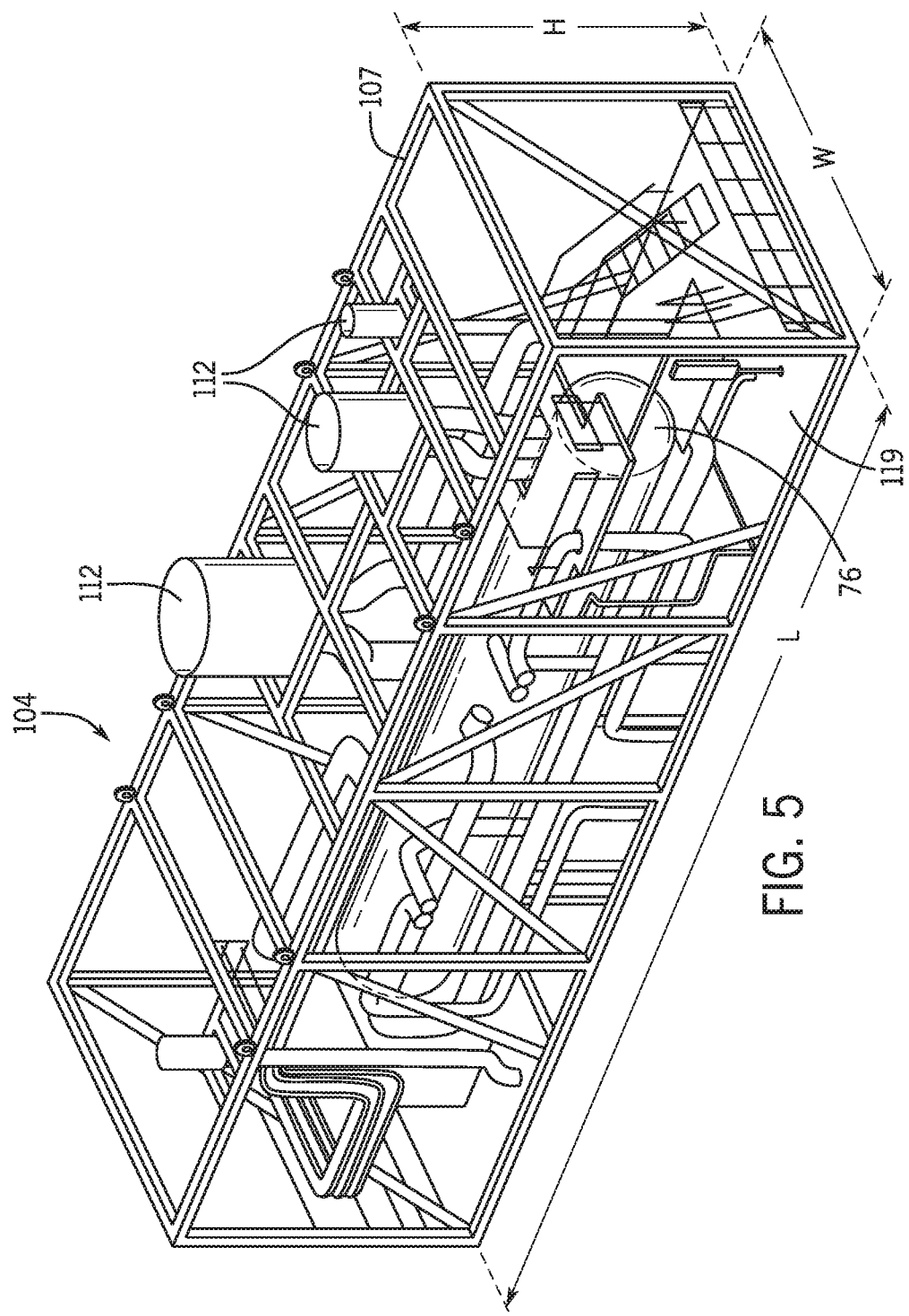
FIG. 5 is a perspective view of an embodiment of a top platform auxiliary module for the top platform assembly of the HRSG of FIG. 3, where the top platform auxiliary module includes a high pressure (HP) drum.
Figure 6:
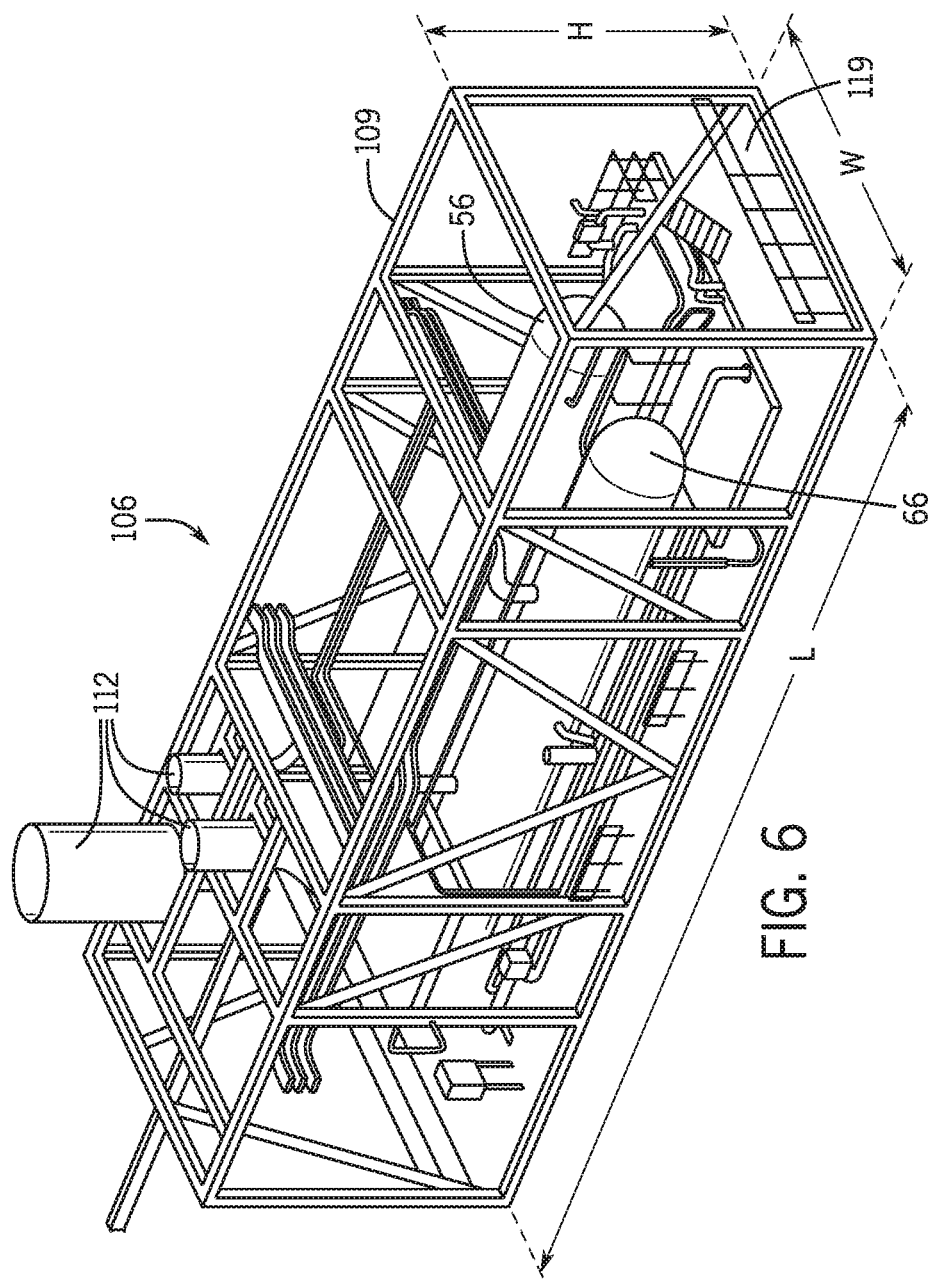
FIG. 6 is a perspective view of an embodiment of a top platform auxiliary module for the top platform assembly of the HRSG of FIG. 3, where the top platform auxiliary module includes a low pressure (LP) drum and intermediate pressure (IP) drum.

FIGS. 4-6 illustrate each of the top platform auxiliary modules 102, 104, 106, respectively. That is, FIG. 4 illustrates the first top platform auxiliary module 102 having the steam manifold 111, two of the silencers 112, and the cable trays, FIG. 5 illustrates the second top platform auxiliary module 104 having the HP drum 76, three of the silencers 112, and the cable trays, and FIG. 6 illustrates the third top platform auxiliary module 106 having the IP drum 66, the LP drum 56, cable trays, and three of the silencers 112. As shown in FIGS. 4-6, each top platform auxiliary module 102, 104, 106 may include a generally planar, or flat, bottom surface 119, which may include a solid surface or frame members (e.g., forming a mesh or lattice structure). The generally planar bottom surfaces 119 of the modules 102, 104, 106 (and/or the generally rectangular shapes of the frames) may enable improved disposal of the modules 102, 104, 106 on top of the HRSG base. In other embodiments, the modules 102, 104, 106 may include a different shape that is common between them.

Further, each top platform auxiliary module 102, 104, 106 may include a corresponding frame 105, 107, 109 configured to receive any of a family of differently sized components. For example, focusing in particular on the top platform auxiliary module 104 having the HP drum 76 in FIG. 5, the frame 107 of the top platform auxiliary module 104 may be sized in accordance with the above description to receive any of a family of differently sized HP drums 76. That is, the frame 107 having the above-described size could receive any of a number of differently sized HP drums 76 depending on the power needs of the corresponding HRSG and/or CCPP. By way of non-limiting example, the above-described frame 107 can receive the HP drum 76 having an approximate total height between 1.0 meter (3.3 feet) and 3.0 meters (9.8 feet). Further, the above-described frame 107 can receive the HP drum 76 having an approximate total length between 12 meters (39.4 feet) and 22 meters (72.2 feet). Of course, as previously described, the presently contemplated embodiments may be scaled for various sized HRSGs. Thus, the disclosed concept of including a modular frame (e.g., the frame 107) configured to receive any of a family of differently sized components, depending on power needs, may be applied to a smaller HRSG or a larger HRSG than those included in the examples provided herein.

Figure 7:
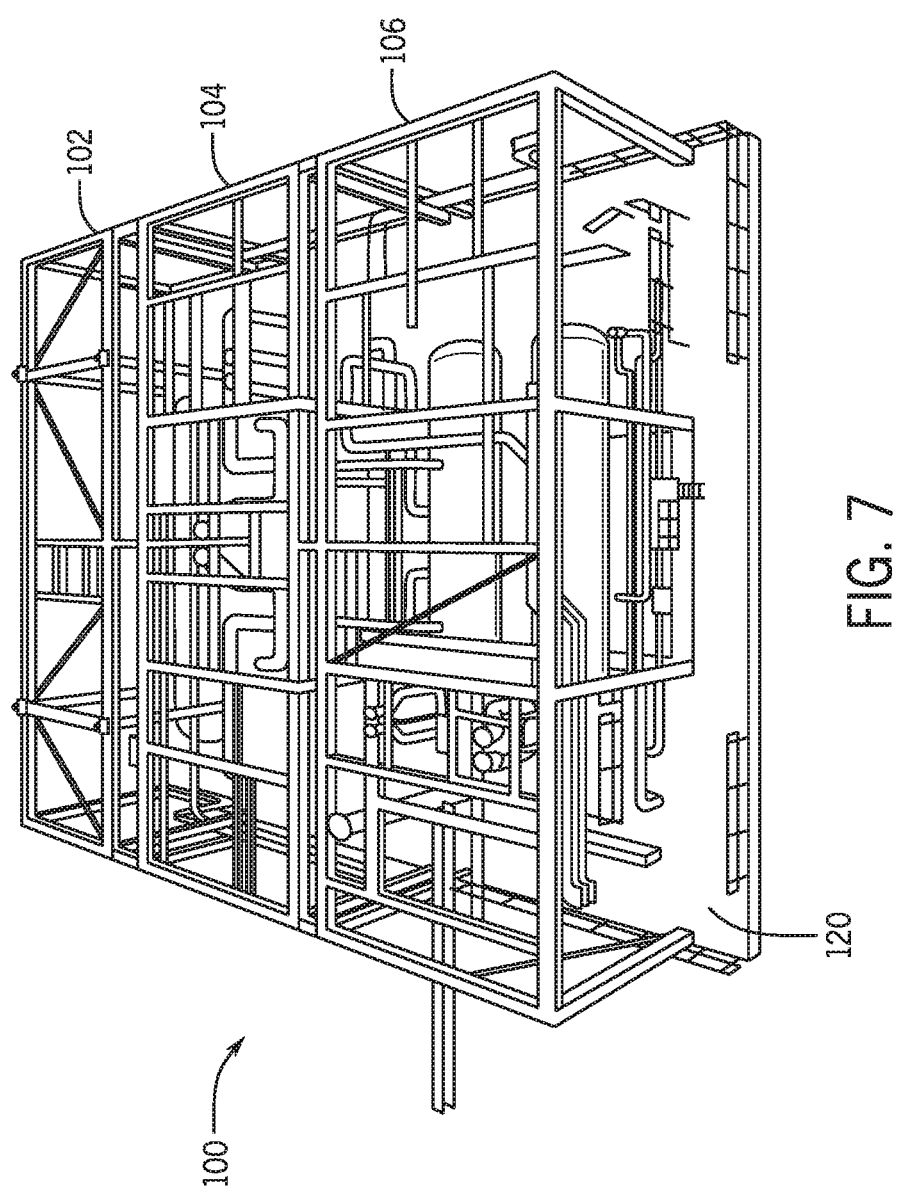
FIG. 7 is a top perspective view of an embodiment of a portion of the top platform assembly for the HRSG of FIG. 3 (with certain components removed for visibility)
Figure 8:
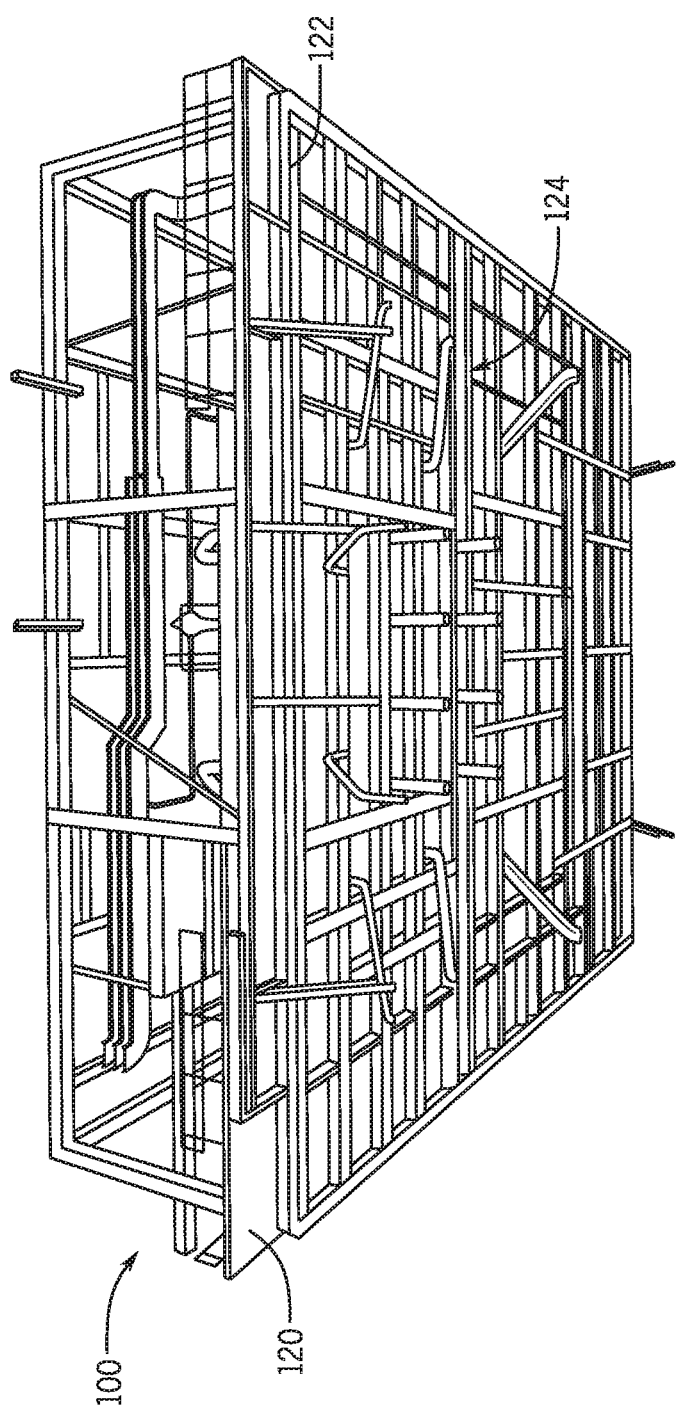
FIG. 8 is a bottom perspective view of an embodiment of a portion of the top platform assembly for the HRSG of FIG. 3 (with certain components removed for visibility)

FIGS. 7 and 8 include top and bottom perspective views, respectively, of the top platform 100. For example, FIG. 7 illustrates the top platform 100 formed by the first top platform auxiliary module 102, the second top platform auxiliary module 104, and the third top platform auxiliary module 106. As shown, the modules 102, 104, 106 are connected to each other, which causes connection of walkways 120 (e.g., formed by platform grating material, such as steel grating material) pre-disposed in the various modules 102, 104, 106, to form a workable space. It should be appreciated that the silencers 112, and certain other components illustrated in FIGS. 3-6, are removed from FIGS. 7 and 8 for clarity regarding other features of the top platform assembly 100. It should also be appreciated that the silencers 112, and certain other components illustrated in FIGS. 3-6, which may limit logistics optimization, may be installed in the top platform auxiliary modules 102, 104, 106 on the ground, prior to their elevation and formation of the illustrated top platform assembly 100.

As shown in FIG. 7, the top platform auxiliary modules 102, 104, 106 may be connected after they are disposed on the base of the HRSG. A walkway 120 (shown in FIGS. 7 and 8) may be formed above a lower side 122 (shown in FIG. 8) of the frame of each module 102, 104, 106. Further, terminal connections of the top platform auxiliary modules 102, 104, 106 may extend downwardly from the top platform auxiliary modules 102, 104, 106, for connection to base connections of the base 101 (see FIG. 3). PUP pieces 124 (illustrated in FIG. 7) may be utilized to connect terminal connections of the top platform auxiliary modules 102, 104, 106 with the corresponding base connections. "PUP pieces" may be used in the present disclosure to refer to a short length of pipe utilized to couple two other pipe connections (e.g., terminal connections of the modules 102, 104, 106 with corresponding terminal connections of the base 101).

In the illustrated embodiment, the PUP pieces 124 are disposed on the ends of the terminal connections of the top platform auxiliary modules 102, 104, 106. However, it should be understood that the top platform auxiliary modules 102, 104, 106 may be disposed on the base 101 of the HRSG 100 without the PUP pieces 124 attached to the terminal connections, and the PUP pieces 124 may be utilized to couple the terminal connections with the base connections after the terminal connections and the base connections are aligned (e.g., via the mounting/alignment features of the HRSG). For example, as will be appreciated in view of FIG. 12 and corresponding description, each of the top platform modules 102, 104, 106 may include mounting and/or alignment features configured to appropriately position the top platform modules 102, 104, 106 relative to the base 101 (see FIG. 3) such that the terminal connections and corresponding base connections are aligned for coupling, for example via the intervening PUP pieces 124 illustrated in FIG. 7. As previously described, the terminal connections are standardized as a part of the modules 102, 104, 106, and are configured to fit, with minimal adaptation, a range of pressure parts in the base 101 (see FIG. 3) of the HRSG 18 (see FIG. 3). That is, the modules 102, 104, 106 may be standardized to fit multiple embodiments of the base 101, where each embodiment of the base 101 may include different sized pressure parts (e.g., based on power needs) than the other embodiments of the base 101. These features will be described in detail with reference to FIG. 12.

Figure 9:
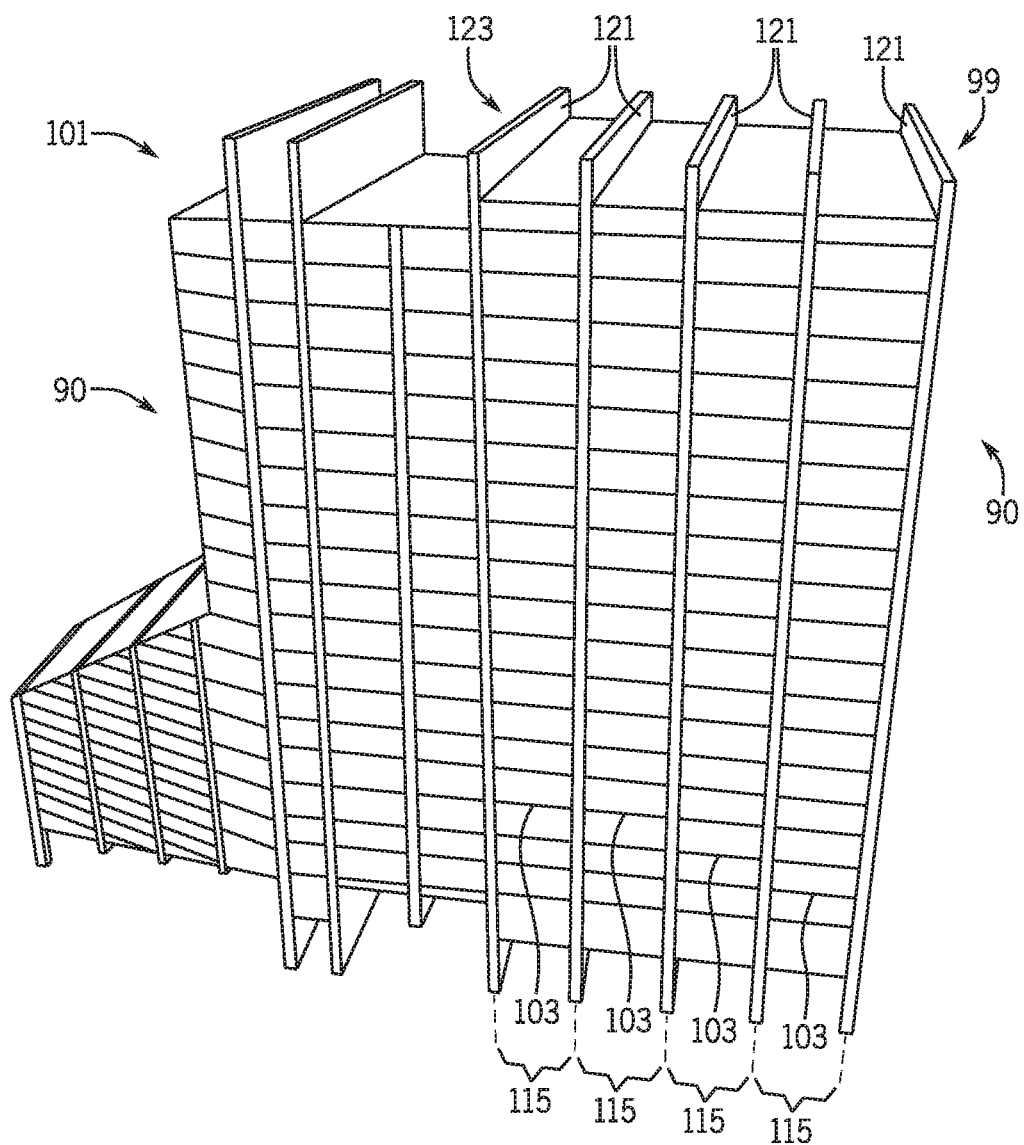
FIG. 9 is a perspective view of an embodiment of the base of the HRSG of FIG. 3.

FIGS. 9-12 illustrate features that enable positioning of the top platform auxiliary modules 102, 104, 106 relative to the base 101, such that the base connections and top platform auxiliary module terminal connections align. For example, as illustrated in FIG. 9, and as previously described, the base 101 may include several columns 103 spaced particular distances 115 away from each other to ensure that the components (e.g., evaporator sections, superheater sections, economizer sections) and connection portions thereof within the columns 103 will align with the terminal connections protruding from the top platform auxiliary modules (not shown). The distances 115 may be, for example, between 2.0 meters (6.6 feet) and 5.0 meters (16.4 feet), 2.5 meters (8.2 feet) and 4.5 meters (14.8 feet), 3.0 meters (9.8 feet) and 4.0 meters (13.1 feet), or 3.25 meters (10.7 feet) and 3.75 meters (12.3 feet).

At a top 99 of the base 101, ridges 121 may extend upwardly from the base 101. The ridges 121 each correspond to one of the columns 103. Each ridge 121 extends a similar distance upwardly, such that a substantially flat plane 123 extends across the tops of the ridges 121. The top platform auxiliary modules (not shown) may be configured to be disposed on the tops of the ridges 121, such that bottoms of the top platform auxiliary modules (not shown) are disposed on the tops of the ridges 121. For example, as previously described, each top platform auxiliary module 102, 104, 106 may include a generally flat or planar bottom surface 119 which is received along the flat plane 123 defined by the ridges 121 of the base 101.

Figure 10:
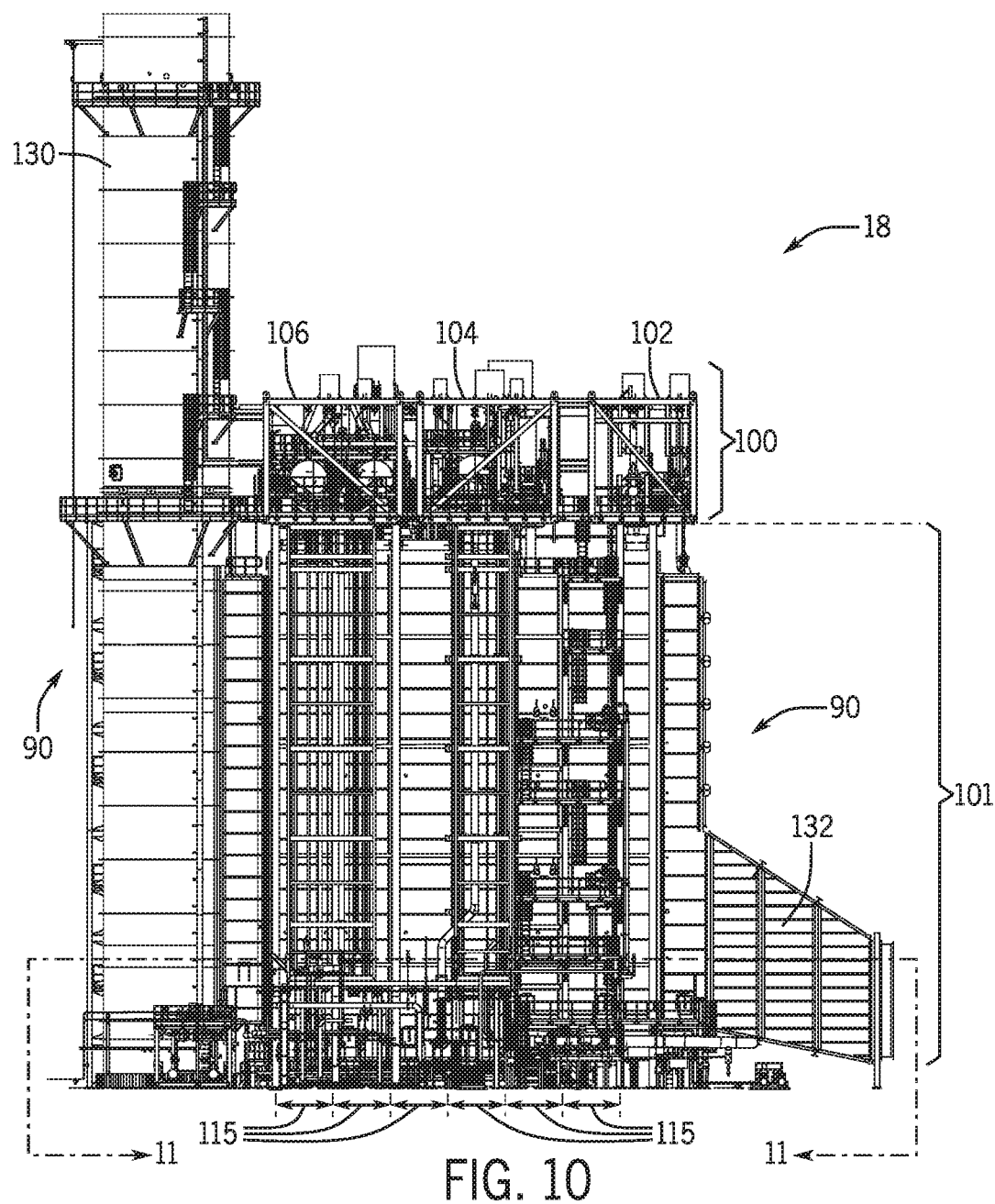
FIG. 10 is a side view of an embodiment of the HRSG of FIG. 3.
Figure 11:
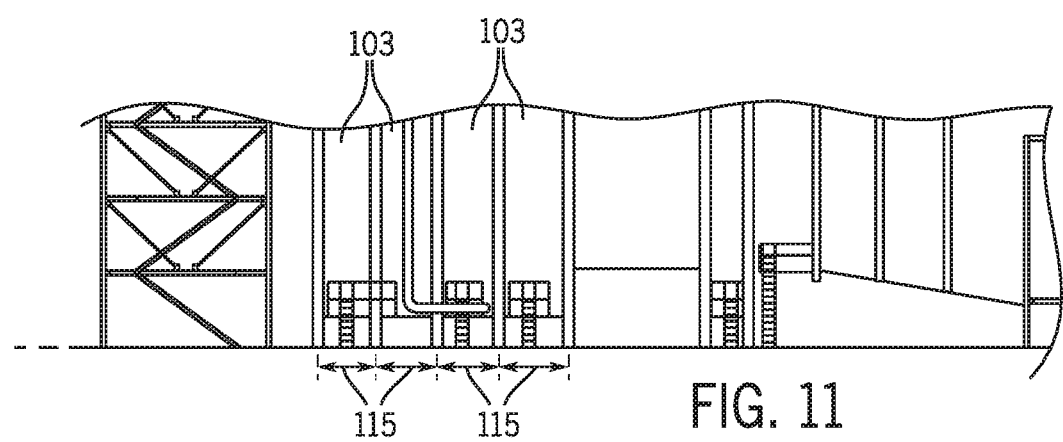
FIG. 11 is a side view of a portion of the HRSG of FIG. 11, taken along line 11-11 in FIG. 10.

FIGS. 10 and 11 illustrate how the columns 103 of the base 101 are spaced the aforementioned distances 115 to facilitate simplified connections between the components of the base 101 and the components of the modules 102, 104, 106 (e.g., in conjunction with the above-described mounting features 128 (e.g., hooks, extensions, arms, claws) that interface with the ridges 121 of the base 101, as illustrated in FIG. 10). FIG. 11 also illustrates the smoke stack 130 disposed at one end 90 of the base 101 and the inlet duct 132 (e.g., for receiving exhaust gas from one or more gas turbines) disposed at the other end 90 of the base 101.

Figure 12:
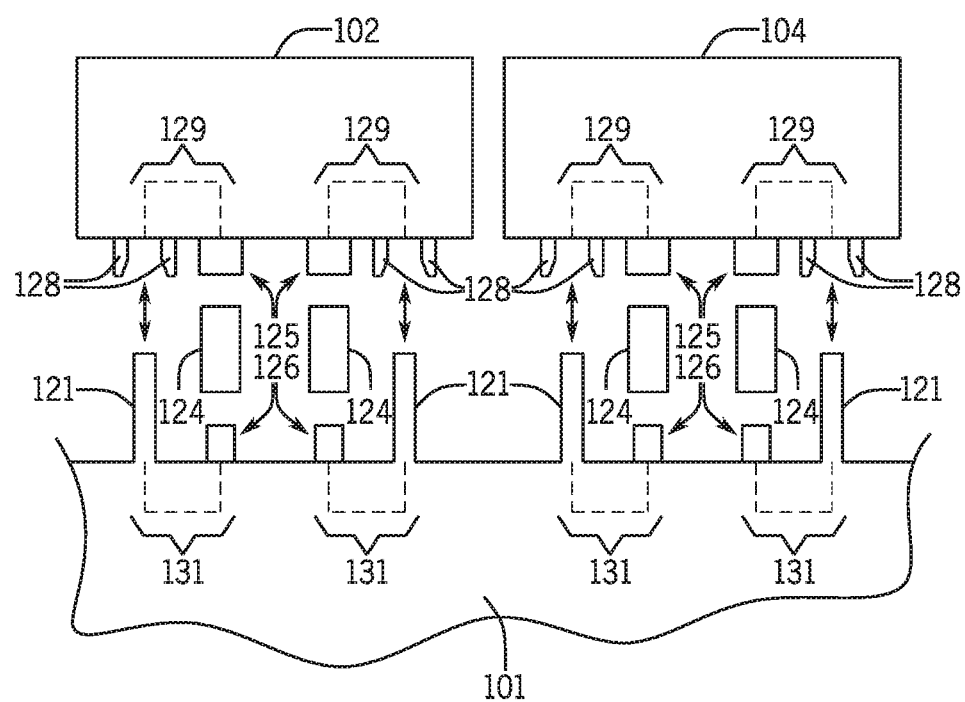
FIG. 12 is a schematic illustration of an embodiment of interfacing features between the top platform assembly and the base of the HRSG of FIG. 3.

As shown in the schematic illustration of FIG. 12, each top platform auxiliary module (for example, top platform auxiliary modules 102, 104 in the illustrated embodiment) may include terminal connections 125 configured to interface with base connections 126 of components within the base 101 (e.g., with PUP pieces 124 extending between the terminal connections 125 and the base connections 126). As shown, the top platform auxiliary modules (for example, modules 102, 104 in the illustrated embodiment) may include alignment and/or mounting features 128 (e.g., pairs of hooks, claws, arms, or extensions) between which the ridges 121 are configured to be disposed. That is, each pair of mounting features 128 may include two arms with a gap between the two arms, where the gap is configured to receive one of the ridges 121. The mounting features 128 (e.g., pairs of hooks, claws, arms, or extensions) may be spaced a distance 129 from the terminal connections 125 of the modules, and the ridges 121 may be spaced at a distance 131 from the base connections 126, such that, upon receiving the ridges 121 of the base 101 in a gap between the mounting features 128 of the module 102 or 104, the base connections 126 are aligned with the terminal connections 125 of the modules, thereby simplifying the connection between the terminal connections 125 and the corresponding base connections 126. In this way, the ridges 121 may be referred to as "slide-in plates." It should be noted that terminal connections 125 of the modules 102, 104 and base connections 126 of the base 101 may refer to fluid connections (e.g., piping), electrical connections, and/or mechanical connections.

Figure 13:
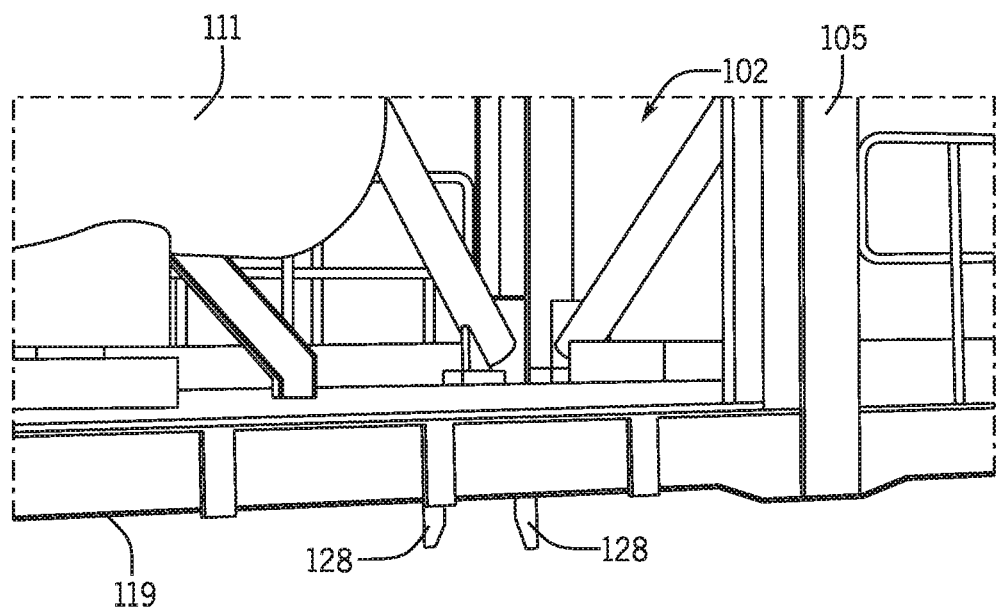
FIG. 13 is a perspective view of an embodiment of interfacing features of a top platform auxiliary module for the top platform assembly of the HRSG of FIG. 3.
Figure 14:
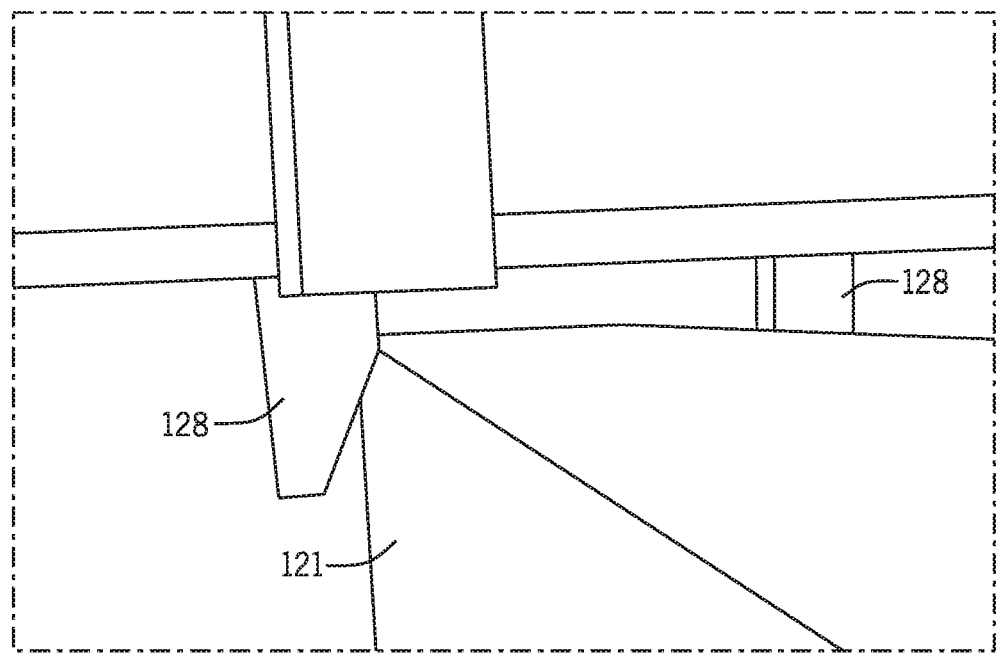
FIG. 14 is a perspective view an embodiment of the interfacing features of FIG. 13 engaging a slide-in plate (or column) of the base of the HRSG of FIG. 3.

It should also be appreciated that, in some embodiments, the ridges 121 may be used specifically for receiving bottom ends of the modules, and that the mounting features 128 (e.g., extensions, hooks, arms, claws) of the modules 102, 104 may be configured to interface with other slide-in plates protruding from the base 101. It should also be noted that "terminal connections 125" may refer to, for example, conduit or other fluid connections, electrical connections, or strictly mechanical connections. Further, corresponding "base connections 126" may refer to conduit or other fluid connections, electrical connections, or strictly mechanical connections. In other words, the interface between the mounting features 128 of the modules 102, 104, 106 and the slide-in plates (or ridges) 121 of the base 101 may be utilized to guide the connections 125 (e.g., fluid, electrical, or mechanical) of the modules 102, 104, 106 toward the connections 126 (e.g., fluid, electrical, or mechanical) of the base, such that the PUP pieces 124 can be attached between the terminal connections 125 and the base connections 126. FIGS. 13 and 14 are perspective views of an embodiment of interfacing features of one of the top platform auxiliary modules 102 with the ridge 121 (or slide-in plate), as previously described. FIG. 13 illustrates the mounting features 128 (e.g., extensions, hooks, arms, claws) of the top platform auxiliary module 102, extending downwardly from the generally planar bottom surface 119 of the top platform auxiliary module 102. FIG. 13 illustrates the mounting features 128 (e.g., extensions, hooks, arms, claws) interfacing with the ridge 121 (e.g., receiving the ridge 121, or slide-in plate, between the two mounting features 128).

Figure 15:
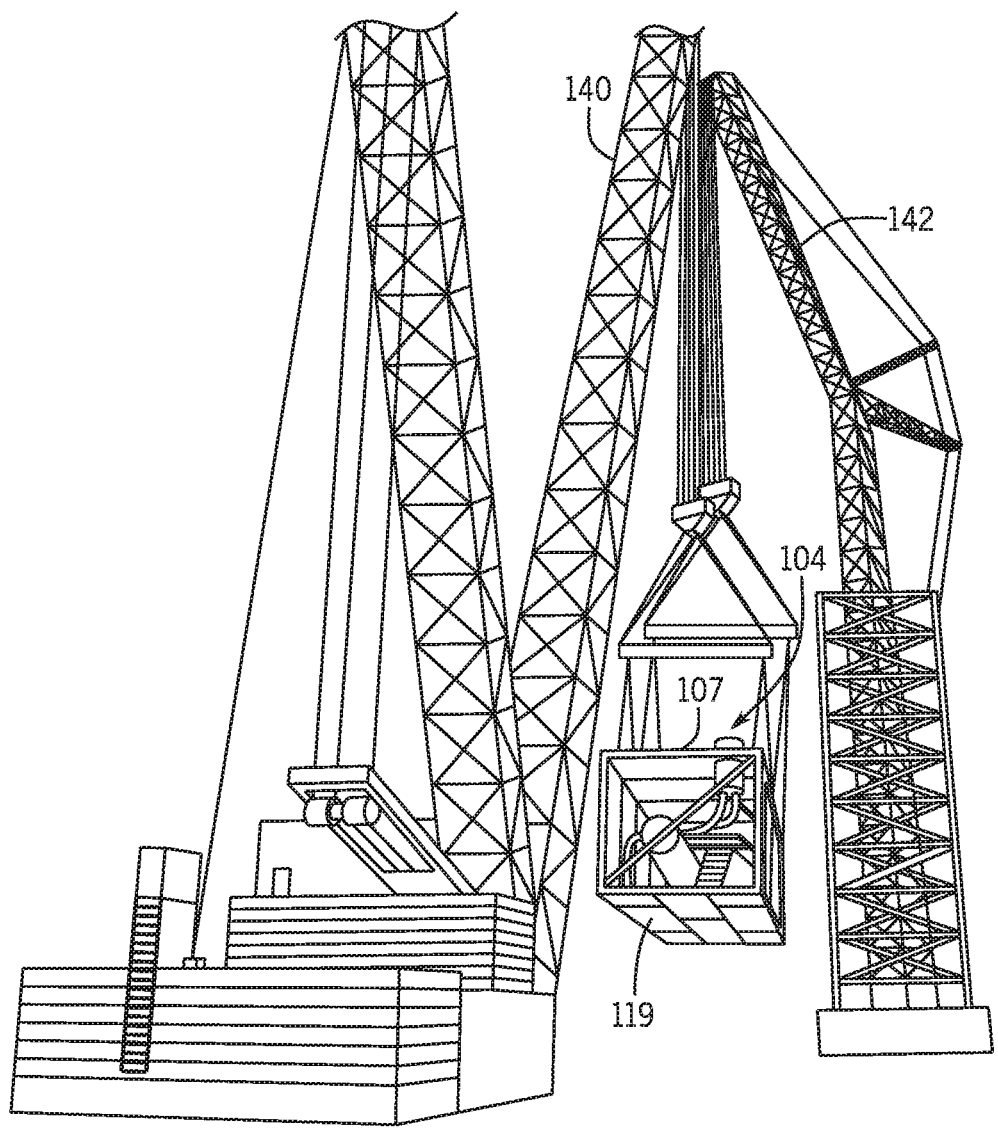
FIG. 15 is a perspective view of an embodiment of a step for a construction maneuver in which a top platform auxiliary module is lifted from the ground toward a top of the base of the HRSG of FIG. 3.
Figure 16:
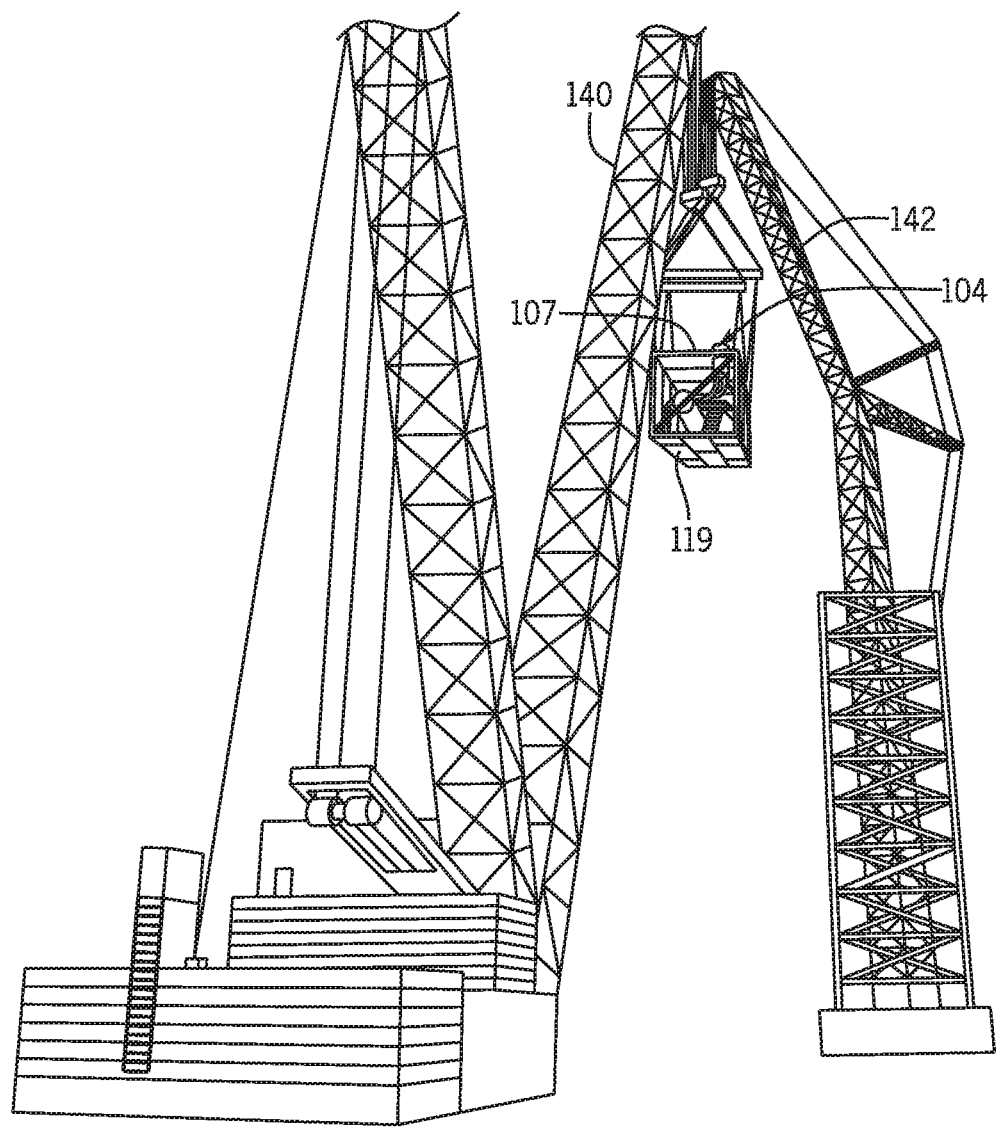
FIG. 16 is a perspective view another step of the construction maneuver of FIG. 15.

As previously described, each top platform auxiliary module may be lifted from the ground to a top of the base of the HRSG. For example, FIGS. 15 and 16 are perspective views of an embodiment of a construction maneuver in which the second top platform auxiliary module 104 is lifted from the ground toward a top of the base of the HRSG of FIG. 3. FIG. 15 illustrates the second top platform auxiliary module 104 at a first elevation during the construction (or installation) maneuver and FIG. 16 illustrates the second top platform auxiliary module 104 at a second elevation during the construction (or installation) maneuver. As shown, a first crane 140 and a second crane 142 may be utilized to lift the second top platform auxiliary module 104, which was pre-arranged and formed on the ground, to elevation (e.g., toward a top of a base of the HRSG). By modularizing a number of components generally disposed at a top of the base of the HRSG as shown, the components can be interfaced with the base of the HRSG with fewer tedious and time-consuming techniques than traditional embodiments. Because of the weight of the module 104, the two cranes 140, 142 may be disposed on either side of the module 104, and may lift the module 104 on either side, thereby stabilizing the lifting technique. In traditional embodiments, a single, smaller crane may be used to lift individual components over a larger number of lifting maneuvers, which may contribute to longer construction time.

Figure 17:
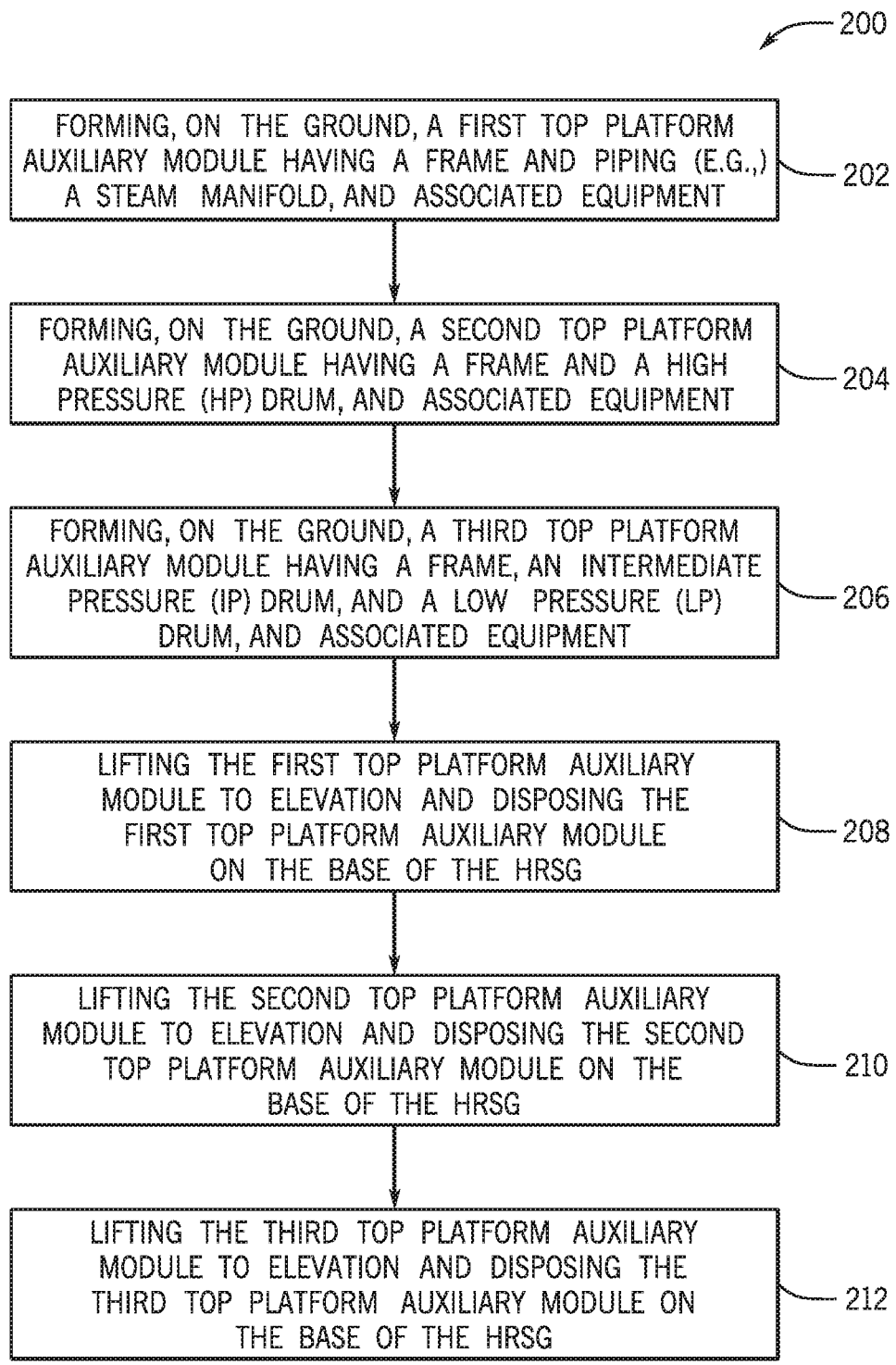
FIG. 17 is an embodiment of a method of constructing the HRSG of FIG. 3.

FIG. 17 is an embodiment of a method 200 of constructing the HRSG of FIG. 3. The method includes forming (block 202), on the ground, a first top platform auxiliary module having a frame and piping (e.g., a steam manifold), and associated equipment. The method 200 also includes forming (block 204), on the ground, a second top platform auxiliary module having a frame and a high pressure (HP) drum, and associated equipment. The method 200 also includes forming (block 206), on the ground, a third top platform auxiliary module having a frame, an intermediate pressure (IP) drum, a low pressure (LP) drum, and associated equipment. It should be noted that, in blocks 202, 204, and 206, the modules may be formed off-site and shipped on-site having already been assembled.

The method 200 also includes lifting (block 208) the first top platform auxiliary module to elevation, and disposing the first top platform auxiliary module on the base of the HRSG. The method 200 also includes lifting (block 210) the second top platform auxiliary module to elevation, and disposing the second top platform auxiliary module on the base of the HRSG. The method 200 also includes lifting (block 212) the third top platform auxiliary module to elevation, and disposing the third top platform auxiliary module on the base of the HRSG. In blocks 208, 210, and 212, each corresponding module may include a generally flat or planar bottom surface configured to be disposed in a plane formed by the base of the HRSG. For example, as previously described, the plane may be defined by ridges extending from columns of the base of the HRSG, where each column corresponds to particular HRSG equipment. Further, when disposing the modules on the top of the base of the HRSG, mounting features of the modules (e.g., extensions, claws, arms, hooks) may receive the ridges (and/or other slide-in plates) of the base of the HRSG. The mounting features of the modules may be spaced a particular distance from terminal connections (e.g., fluid connections, such as piping) of the modules configured to be coupled to base connections (e.g., fluid connections, such as piping) of the base. Thus, the space between the columns and the base connections of the base may be designed to accommodate the space between the mounting features and terminal connections of the modules.

It should be noted that the above-described HRSG examples include a triple-pressure HRSG having an LP drum, an IP drum, and an HP drum. However, the disclosed modularized top platform auxiliary modules can also be utilized in other types of HRSGs, such as a once-through HRSG. A once-through HRSG may not include an HP drum. For example, in a once-through HRSG, the IP drum and LP drum may be segmented into two separate top platform auxiliary modules, with a third top platform auxiliary module containing a steam manifold. In another once-through HRSG, only two top platform auxiliary modules may be used (e.g., one having a steam manifold, the other having both the IP and LP drums). In still another once-through HRSG, multiple manifolds and/or piping assemblies may include dedicated top platform auxiliary modules (e.g., a first top platform auxiliary module corresponding to a first manifold, and a second top platform auxiliary module corresponding to a second manifold). Thus, it should be appreciated that the above-described examples in FIGS. 1-17, certain of which relating to triple-pressure HRSGs, can also be applied to other types of HRSGs, such as the above-described once-through HRSG.

Technical effects of the invention include improving construction time of a HRSG, simplifying construction techniques of the HRSG, reducing construction and manufacturing costs of the HRSG, reducing shipping costs and complexity for parts of the HRSG, and improving operability of the HRSG.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of constructing a heat recovery steam generator (HRSG), comprising:
forming a first top platform auxiliary module having a first frame, a steam manifold or a high pressure (HP) drum disposed in the first frame, a first terminal fluid connection corresponding to the HP drum or the steam manifold, and a first mounting feature spaced from the first terminal fluid connection a first predetermined distance;

forming a second top platform auxiliary module having a second frame, an intermediate pressure (IP) drum disposed in the second frame, a second terminal fluid connection corresponding to the IP drum, and a second mounting feature spaced from the second terminal fluid connection a second predetermined distance;

forming a third top platform auxiliary module having a third frame, a low pressure (LP) drum disposed in the third frame, a third terminal fluid connection corresponding to the LP drum, and a third mounting feature spaced from the third terminal fluid connection a third predetermined distance;

forming a base of the HRSG including a first ridge configured to support the first top platform auxiliary module by engaging the first mounting feature, and including a first base fluid connection spaced from the first ridge a fourth distance corresponding to the first predetermined distance such that the first terminal fluid connection is configured to align with the first base fluid connection when the first ridge engages the first mounting feature;

forming the base of the HRSG including a second ridge configured to support the second top platform auxiliary module by engaging the second mounting feature, and including a second base fluid connection spaced from the second ridge a fifth distance corresponding to the second predetermined distance such that the second terminal fluid connection is configured to align with the second base fluid connection when the second ridge engages the second mounting feature;

forming the base of the HRSG including a third ridge configured to support the third top platform auxiliary module by engaging the third mounting feature, and including a third base fluid connection spaced from the third ridge a sixth distance corresponding to the third predetermined distance such that the third terminal fluid connection is configured to align with the third base fluid connection when the third ridge engages the third mounting feature;

lifting the first top platform auxiliary module to elevation, and disposing the first top platform auxiliary module on the base of the HRSG such that the first mounting feature engages the first ridge and the first base fluid connection is aligned with the first terminal fluid connection;

lifting the second top platform auxiliary module to elevation, and disposing the second top platform auxiliary module on the base of the HRSG such that the second mounting feature engages the second ridge and the second base fluid connection is aligned with the second terminal fluid connection; and lifting the third top platform auxiliary module to elevation, and disposing the third top platform auxiliary module on the base of the HRSG such that the third mounting feature engages the third ridge and the third base fluid connection is aligned with the third terminal fluid connection.

2. The method of claim 1, comprising:

coupling the first base fluid connection to the first terminal fluid connection via a first PUP piece;

coupling the second base fluid connection to the second terminal fluid connection via a second PUP piece; and coupling the third base fluid connection to the third terminal fluid connection via a third PUP piece.

3. The method of claim 2, comprising:

disposing a first portion of the first PUP piece along a height direction between a first ridge top of the first ridge and a first base top of the first base fluid connection;

disposing a second portion of the second PUP piece along the height direction between a second ridge top of the second ridge and a second base top of the second base fluid connection; and disposing a third portion of the third PUP piece along the height direction between a third ridge top of the third ridge and a third base top of the third base fluid connection.

4. The method of claim 1, comprising forming the first top platform auxiliary module having the first frame, the steam manifold disposed in the first frame, the first terminal fluid connection corresponding to the steam manifold, and the first mounting feature spaced from the first terminal fluid connection the first predetermined distance.

5. The method of claim 1, comprising forming the first top platform auxiliary module having the first frame, the HP drum disposed in the first frame, the first terminal fluid connection corresponding to the HP drum, and the first mounting feature spaced from the first terminal fluid connection a first predetermined distance.

* * * * *